Jan. 26, 1932. C. P. WALKER 1,842,435
WIRE LOCKING DEVICE
Filed May 7, 1930
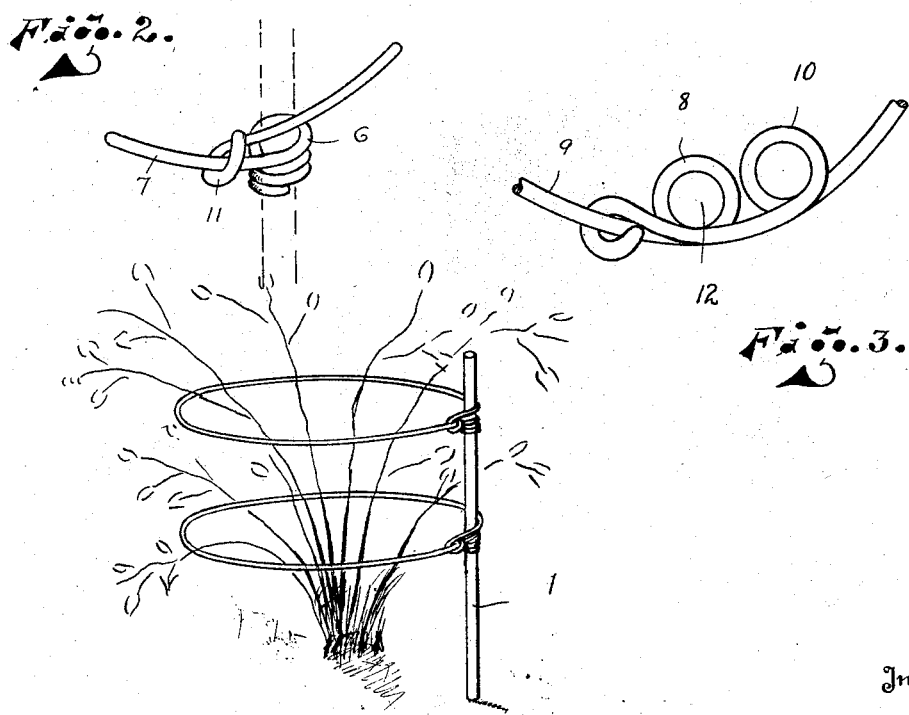
Inventor
CLARENCE P. WALKER.
By Geo Stevens.
Attorney Patented Jan. 26, 1932

1,842,435

UNITED STATES PATENT OFFICE

CLARENCE P. WALKER, OF DULUTH, MINNESOTA, ASSIGNOR OF FIFTY-ONE PER CENT TO EDWARD L. GRUBER, OF DULUTH, MINNESOTA

WIRE LOCKING DEVICE

Application filed May 7, 1930. Serial No. 450,388.

This invention relates to wire locking devices and the principal object is to provide a more practical, efficient, and adjustable locking device than heretofore known.

Another object is to provide such a locking device applicable to a plant trellis having the least tendency to injure a plant by contact therewith.

Another object is to provide such a locking device which may be used in various ways to accommodate circumstances.

Still other objects and advantages of the invention will appear in the following description thereof.

Referring now to the accompanying drawings, forming part of this application, and wherein like reference characters indicate like parts:

Figure 1 is a plan view of one of the preferred forms of rings for a trellis to which the invention is applied;

Figure 2 is a perspective view of the novel locking or holding means for the ring in relation to the supporting stake or standard;

Figure 3 is a slightly modified form of locking and supporting termini of the ring; and Figure 4 is a perspective view of one application of the invention.

I have illustrated the invention as being applied to a plant trellis, wherein the support for the trellis is preferably one or more plain metal rods or wires 1, one end of which is designed to be stuck into the ground adjacent a plant or where desired, and the plant supporting ring or rings applied.

This application of the ring to the stake or stakes is accomplished by forming at equally spaced intervals in the ring a short helix such as indicated in Figure 1 at 2, 3 and 4 on the ring 5. One of such helixes is shown at 6 on the end of the plain ring 7 in Figure 2 and another one at 8 on a similar ring 9 in Figure 3.

Figure 3 furthermore illustrates a ring having a helix 10 formed adjacent the hooked end 11 thereof which end is opposite to that one carrying the helix 8; the supporting stake in this instance being shown at 12 within the helix 8.

Now the use of a ring as shown in Figure 3 may vary from that illustrated in that it is quite obvious that this ring if straightened out with its ends disconnected would have the helix 8 at one end and the helix 10 adjacent the hooked end, and in this event a stake could be used in both helixes with the loop straightened out as a straight wire to form a border support or rail for a row of for example small plants when desired. In fact two or three such straight wires could be used one above the other or a continuation of same in a fence like form of most any desired shape.

Either plain or corrugated wire such as shown in Figure 1 may be employed on the single, double or treble stake as indicated in Figure 4 and these loops may vary in size in accordance with the size of the plant as is obvious. The corrugated ring as illustrated at 5 is so designed and may vary considerably in construction for the express purpose of preventing chafing of the leaf or flower stems or stalks of a plant by the action of the wind against same, and is deemed a material departure from anything heretofore known in the art.

It is intended that the plant supporting rings should be made of spring wire either steel or other suitable material so that as the hooked end 11 of the wire is brought about to engage the opposite end inwardly of the helix on the opposite end of the wire there will be a tendency to bind the supporting stake while therein; the action of the hooked terminus of the wire being clearly illustrated in Figure 2 of the drawings that is prior to the insertion of the stake when it appears as in Figure 3, thus forming an adequate locking or holding means to prevent the wire slipping up or down on the stake.

Furthermore it is to be noted that the coiling of the helixes is preferably somewhat tapered and slightly smaller than the diameter of the stake so as to cause binding thereupon when so placed.

It will of course be obvious from the above that one of the principal novel features of the invention consists in the locking device for attaching the ring to the stake and comprising the short tapered helix such as indicated at 6, the other end of the ring being formed into a hook as at 11 for hooking under the ring adjacent the helix. This will cause the hooked end of the ring to bind against the stake because the ring is constructed of spring steel wire which is constantly trying to straighten itself, which, in addition to the friction of the tapered helix on the stake, insures a very secure union. Obviously this form of union of the two members may be employed for various purposes such as the supporting of adjustable shelving, scaffolding, cable grips or the like.

Having thus described my invention, what I claim and desire to secure by Letters Patent, is:

A stake and wire trellis of the class described characterized by the wire having helixes formed at both ends thereof for engagement about a stake, and a hook outwardly of one of the helixes for the purpose described.

In testimony whereof I affix my signature.

CLARENCE P. WALKER.